United States Patent
Zhang (10) Patent No.: US 12,432,815 B2
(45) Date of Patent: Sep. 30, 2025

(54) SWITCHING METHOD AND APPARATUS BASED ON MBMS, AND COMPUTER-READABLE STORAGE MEDIUM

(71) Applicant: DATANG MOBILE COMMUNICATIONS EQUIPMENT CO., LTD., Beijing (CN)

(72) Inventor: Dajun Zhang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 286 days.

(21) Appl. No.: 18/020,072

(22) PCT Filed: Jul. 19, 2021

(86) PCT No.: PCT/CN2021/107205
§ 371 (c)(1),
(2) Date: Feb. 6, 2023

(87) PCT Pub. No.: WO2022/028242
PCT Pub. Date: Feb. 10, 2022

(65) Prior Publication Data
US 2023/0284335 A1 Sep. 7, 2023

(30) Foreign Application Priority Data
Aug. 4, 2020 (CN) .......................... 202010773791.7

(51) Int. Cl.
*H04W 76/40* (2018.01)
*H04W 36/00* (2009.01)

(52) U.S. Cl.
CPC ....... *H04W 76/40* (2018.02); *H04W 36/0007* (2018.08)

(58) Field of Classification Search
CPC .... H04W 76/40; H04W 36/0007; H04W 4/06
See application file for complete search history.

(56) References Cited

U.S. PATENT DOCUMENTS

2010/0329167 A1* 12/2010 Linden ................. H04W 72/30
370/312
2012/0294283 A1 11/2012 Liang et al.
(Continued)

FOREIGN PATENT DOCUMENTS

| CN | 101047528 A | 10/2007 |
|---|---|---|
| CN | 101170724 A | 4/2008 |

(Continued)

OTHER PUBLICATIONS

The Extended European Search Report for the corresponding European Patent Application No. 21853929.4 issued by the European Patent Office on Jan. 8, 2024.

(Continued)

*Primary Examiner* — Kenny S Lin
(74) *Attorney, Agent, or Firm* — Ladas & Parry, LLP (57) ABSTRACT

The present application relates to an MBMS service-based switching method and apparatus, and a computer-readable storage medium, the method comprises: sending a switching request message to a second network node, the switching request message includes a public forwarding channel establishment indication; receiving a switching response message and a switching command message respectively sent by the second network node, the switching response message includes a public forwarding channel address; sending the switching command message to a User Equipment (UE) according to the switching response message; and establishing a public forwarding channel with the second network node according to the public forwarding channel address, the public forwarding channel being used for the first (Continued)

network node to forward MBMS service data packets sent to the UE to the second network node.

18 Claims, 4 Drawing Sheets

(56) References Cited

U.S. PATENT DOCUMENTS

| | | | |
|---|---|---|---|
| 2013/0294326 A1* | 11/2013 | Jiao | H04W 76/11 370/312 |
| 2014/0050138 A1 | 2/2014 | Wang | |
| 2017/0245121 A1 | 8/2017 | Jung et al. | |
| 2017/0310407 A1 | 10/2017 | Le Roux et al. | |
| 2018/0160342 A1 | 6/2018 | Park et al. | |
| 2019/0028285 A1* | 1/2019 | Cheng | H04L 12/189 |
| 2019/0387569 A1 | 12/2019 | Martinez Tarradell et al. | |

FOREIGN PATENT DOCUMENTS

| | | |
|---|---|---|
| CN | 101193341 A | 6/2008 |
| CN | 101197682 A | 6/2008 |
| CN | 101197758 A | 6/2008 |
| CN | 101312552 A | 11/2008 |
| CN | 101374327 A | 2/2009 |
| CN | 102075867 A | 5/2011 |
| CN | 102131251 A | 7/2011 |
| CN | 102868994 A | 1/2013 |
| CN | 104067643 A | 9/2014 |
| CN | 106341848 A | 1/2017 |
| CN | 106941733 A | 7/2017 |
| CN | 109246770 A | 1/2019 |
| CN | 110868744 A | 3/2020 |
| CN | 111436087 A | 7/2020 |
| EP | 3125585 A1 | 2/2017 |
| WO | 2011079821 A1 | 7/2011 |
| WO | 2016081162 A1 | 5/2016 |
| WO | WO-2020122797 A1 * | 6/2020 |

OTHER PUBLICATIONS

3GPP TS 36.300 V16.2.0 (2020-07), "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16).".
Notice of Allowance for the corresponding Chinese Patent Application No. 202010773791.7 issued on Jun. 5, 2023, and its English translation provided by Google Translate.
"The intra E-UTRAN handover in ECM-Connected state," Wang Xin, (School of Communication and Information Technology XI'an University of Posts, &Telecommunications Xi'an 710061 China), Information Technology, vol. 12, 2014, Dec. 25, 2014.
"Introduction of inter-RAT DTM Handover," 3GPP TSG-RAN-WG2 Meeting #56, R2-063673, CR2954r1 to 25.331, Nokia, Nov. 17, 2006.
International Search Report for PCT/CN2021/107205 issued on Oct. 27, 2021, and its English Translation provided by WIPO.
Written Opinion for PCT/CN2021/107205 issued on Oct. 27, 2021, and its English Translation provided by WIPO.
First Office Action and search report for Chinese Patent Application 202010773791.7 issued on Oct. 10, 2022 by the Chinese Patent Office, and Its English Translation.
3GPP TS 37.340 V15.3.0 (Sep. 2018) sections 10.3-10.5, 3rd Generation Partnership Project; Technical Specification Group Radio Access Network, Evolved Universal Terrestrial Radio Access (E-UTRA) and NR; Multi-connectivity; Stage 2 (Release 15); all pages.

* cited by examiner

SWITCHING METHOD AND APPARATUS BASED ON MBMS, AND COMPUTER-READABLE STORAGE MEDIUM

CROSS-REFERENCE TO RELATED APPLICATIONS

This application is a U.S. National Phase Application of PCT/CN2021/107205, which is based on and claims priority to Chinese Patent Application No. 202010773791.7, filed on Aug. 4, 2020, in the China National Intellectual Property Administration, entitled "SWITCHING METHOD AND APPARATUS BASED ON MBMSSWITCHING AND COMPUTER-READABLE STORAGE MEDIUM," the disclosure of which are incorporated herein by reference in their entireties.

TECHNICAL FIELD

The present application relates to the field of wireless communication technology, and specifically, to a switching method and apparatus based on MBMS service, and a computer-readable storage medium.

BACKGROUND

In the prior art, the 4G Multimedia Broadcast Multicast Service (MBMS) technology only allows a User Equipment (UE) to switch to a statically planned target cell, so that it can receive MBMS bearers of interest, which certainly will lead to a restricted transmission of MBMS service data packets. For example, in Single Cell-Point To Multipoint (SC-PTM) mode signaling process of the 4G MBMS, the interested UE only needs to read Single Cell-Multicast Common Control Channel (SC-MCCH) information to obtain scheduling information of Single Cell-Multicast Traffic Control Channel (SC-MTCH), i.e., receiving the MBMS service data packets in an idle or a connected state.

5G New Radio (NR), as a new generation of wireless access technology network, also has a demand for multimedia multicast broadcast services. When a UE switches from one network node to another network node, how to ensure the continuity of transmission of the MBMS service data packets and reduce the interruption delay of transmission of the MBMS service data packets are issues to be solved.

SUMMARY

The present application provides a switching method and apparatus based on MBMS service, and a computer-readable storage medium.

According to a first aspect of the present disclosure, there is provided a switching method based on MBMS service, applied to a first network node, comprising:

sending a switching request message to a second network node, the switching request message includes a public forwarding channel establishment indication;

receiving a switching response message and a switching command message respectively sent by the second network node, the switching response message includes a public forwarding channel address;

sending the switching command message to a User Equipment (UE) according to the switching response message; and establishing a public forwarding channel with the second network node according to the public forwarding channel address, the public forwarding channel being used for the first network node to forward MBMS service data packets sent to the UE to the second network node.

Optionally, the establishing the public forwarding channel with the second network node according to the public forwarding channel address, comprises:

establishing the public forwarding channel with the second network node according to the public forwarding channel address and a granularity of MBMS sessions corresponding to the MBMS service data packets.

Optionally, the forwarding of subsequent data packets of the MBMS service to the second network node is terminated when an end indication sent by the second network node is received.

Optionally, the UE is a first UE in a connected state that is receiving the MBMS service data packets.

Optionally, the public forwarding channel is reused when other UEs other than the UE switch from the first network node to the second network node, the other UEs include at least one of the following: the UE in the connected state that is receiving the MBMS sent by the first network node, a UE in an idle state, and a UE in an inactive state.

Optionally, after sending the switching command message to the UE, the method further comprises:

when context information of a first user plane is present in the MBMS service data packets, actively or periodically sending first numbering information of the MBMS service data packets to the second network node according to the granularity of the MBMS sessions corresponding to the MBMS service data packets, so that the second network node reconstructs corresponding context information of the user plane according to the first numbering information.

Optionally, the context information of the first user plane includes context information of Packet Data Convergence Protocol (PDCP), and/or context information of other user planes; the first numbering information includes at least one of the following: an initial superframe number, a PDCP sequence number, and other numbering information.

Optionally, after sending the switching command message to the UE, the method further comprises:

sending, to the second network node, second numbering information of unsuccessfully forwarded data packets corresponding to the MBMS service data packets according to a granularity of a bearer corresponding to the MBMS service data packets, so that the second network node reconstructs the context information of the corresponding user plane according to the second numbering information and an unsuccessfully forwarded data packet is retransmitted selectively; the second numbering information includes at least one of the following: the initial superframe number, the PDCP sequence number, and the other numbering information.

Optionally, system broadcast information is updated according to MBMS service data packets supported by adjacent nodes other than the second network node when the switching command message and/or the switching response message include a list of failed MBMS sessions, the list of failed MBMS sessions being used for characterizing that the MBMS sessions in the list of failed MBMS sessions cannot be provided by a broadcast mode of the second network node; or the list of failed MBMS sessions being used for characterizing that the second network node may not support the MBMS sessions in the list of failed MBMS sessions.

Optionally, sending the switching request message to the second network node comprises:

sending the switching request message to a control plane entity of the second network node via Xn or Ng interface.

According to a second aspect of the present disclosure, there is provided an MBMS service-based switching method, applied to the second network node, comprising:

receiving a switching request message sent by a first network node, the switching request message includes a public forwarding channel establishment indication;

determining a public forwarding channel address and generating a switching command message and a switching response message according to the public forwarding channel establishment indication, the switching response message includes the public forwarding channel address;

sending the switching response message and the switching command message to the first network node, respectively, so that the first network node sends the switching command message to a User Equipment (UE) according to the switching response message, and establishes a public forwarding channel with the second network node according to the public forwarding channel address, the public forwarding channel address being used for the first network node to establish the public forwarding channel with the second network node.

Optionally, sending the switching response message and the switching command message to the first network node, respectively, comprises:

sending the switching response message and the switching command message, respectively, to the first network node by a control plane entity of the second network node.

Optionally, determining the public forwarding channel address according to the public forwarding channel establishment indication, comprises:

sending a bearer establishment request message to a user plane entity of the second network node by the control plane entity of the second network node;

determining, by the user plane entity of the second network node, the public forwarding channel address according to the bearer establishment request message and the public forwarding channel establishment indication, and sending a bearer establishment response message including the public forwarding channel address to the control plane entity of the second network node.

Optionally, after sending the bearer establishment response message including the public forwarding channel address to the control plane entity of the second network node, the method further comprises:

establishing, by the control plane entity of the second network node, a bearer the same as the user plane entity of the second network node, the bearer includes an MBMS bearer.

Optionally, admission control is performed on the MBMS sessions according to an identification of the MBMS sessions included in the switching request message.

According to a third aspect of the present disclosure, there is provided an MBMS service-based switching apparatus, applied to a first network node, comprising:

a memory, configured to store a computer program;

a transceiver, configured to send and receive data under the control of a processor;

a processor, configured to read the computer program in the memory and perform the following actions:

sending a switching request message to a second network node, the switching request message includes a public forwarding channel establishment indication;

receiving a switching response message and a switching command message respectively sent by a second network node, the switching response message includes the public forwarding channel address;

sending the switching command message to a User Equipment (UE) according to the switching response message; and establishing a public forwarding channel with the second network node according to the public forwarding channel address, the public forwarding channel being used for the first network node to forward MBMS service data packets sent to the UE to the second network node.

According to a fourth aspect of the present disclosure, there is provided an MBMS service-based switching apparatus, applied to a second network node, comprising:

a memory, configured to store a computer program;

a transceiver, configured to send and receive data under the control of a processor;

a processor, configured to read the computer program in the memory and perform the following actions:

receiving a switching request message sent by a first network node, the switching request message includes a public forwarding channel establishment indication;

determining a public forwarding channel address and generating a switching command message and a switching response message according to the public forwarding channel establishment indication, the switching response message includes the public forwarding channel address;

sending the switching response message and the switching command message to the first network node, respectively, so that the first network node sends the switching command message to a User Equipment (UE) according to the switching response message, and establishes a public forwarding channel with the second network node according to the public forwarding channel address, the public forwarding channel address being used for the first network node to establish the public forwarding channel with the second network node.

According to a fifth aspect of the present disclosure, there is provided an MBMS service-based switching apparatus, applied to a first network node, comprising:

a first processing unit, configured to send a switching request message to a second network node, the switching request message includes a public forwarding channel establishment indication;

a second processing unit, configured to receive a switching response message and a switching command message respectively sent by the second network node, the switching response message includes a public forwarding channel address; and a third processing unit, configured to send the switching command message to a User Equipment (UE) according to the switching response message, and establish a public forwarding channel with the second network node according to the public forwarding channel address, the public forwarding channel being used for the first network node to forward MBMS service data packets sent to the UE to the second network node.

According to a sixth aspect of the present disclosure, there is provided an MBMS service-based switching apparatus, applied to a second network node, comprising:

a fourth processing unit, configured to receive a switching request message sent by a first network node, the switching request message includes a public forwarding channel establishment indication;

a fifth processing unit for determining a public forwarding channel address and generating a switching command message and a switching response message according to the public forwarding channel establishment indication, the switching response message includes the public forwarding channel address; and a sixth processing unit, configured to send the switching response message and the switching command message to the first network node, respectively, so that the first network node sends the switching command message to a User Equipment (UE) according to the switching response message, and establishes a public forwarding channel with the second network node according to the public forwarding channel address, the public forwarding channel address being used for the first network node to establish the public forwarding channel with the second network node.

According to a seventh aspect of the present disclosure, there is provided a non-transitory computer-readable storage medium storing a computer program, the computer program being used for causing the processor to perform the method described in the first and second aspects.

Additional aspects and advantages of the present application will be given in part in the description which follows and, will be apparent from the following description, or may be learned by practice of the present application.

BRIEF DESCRIPTION OF THE DRAWINGS

In order to illustrate the technical solution more clearly in embodiments of the present application, the accompanying drawings needed in the description of the embodiments of the present application will be briefly described below.

DETAILED DESCRIPTION

Embodiments of the present application are described in detail below, and examples of said embodiments are shown in the accompanying drawings, where the same or similar numerals indicate the same or similar elements or elements having the same or similar functions throughout. The embodiments described below by reference to the accompanying drawings are exemplary, and are merely intended to explain the present application and not to be construed as a limitation on the present application.

It may be understood by those skilled in the art that, unless specifically stated, the singular forms "a", "one", "said" and "the" as used herein may also include the plural forms. It is to be further understood that the phrasing "comprising" as used in the specification of the present application specifies the presence of the stated features, integers, steps, operations, elements, and/or components, but does not preclude the presence or addition of one or more other features, integers, steps, operations, elements, components and/or groups thereof. It should be understood that, when we say that an element is "connected" or "coupled" to the other element, it may be directly connected or coupled to the other element, or there may be intermediate elements. Additionally, "connected" or "coupled" as used herein may include wirelessly connected or wirelessly coupled. The phrasing "and/or" as used herein includes any or all combinations of one or more of the associated listed items.

The term "and/or" in embodiments of the present application describes the association of associated objects and indicates that three relationships may exist, e.g., A and/or B, which may indicate the presence of A alone, the presence of both A and B, and the presence of B alone. The character "/" generally indicates an "or" relationship between the associated objects before and after. The term "a plurality of" in the embodiments of the present application refers to two or more, and other quantifiers are similar.

The technical solution provided by the embodiments of the present application may be applied to a variety of systems, especially 5G systems. For example, the applicable systems may be a Global System for Mobile Communications (GSM) system, a Code Division Multiple Access (CDMA) system, a Wideband Code Division Multiple Access (WCDMA)/General Packet Radio Services (GPRS) system, a Long Term Evolution (LTE) system, an LTE Frequency Division Duplex (FDD) system, an LTE Time Division Duplex (TDD) system, a Long Term Evolution-Advanced (LTE-A) system, a Universal Mobile Telecommunications System (UMTS), a Worldwide Interoperability for Microwave Access (WiMAX) system, a 5G New Radio (NR) system, and so on. These various systems each include terminal and network devices. The system may also include a core network part, such as an Evolved Packet System (EPS), a 5G system (5GS), and so on.

The technical solution in the embodiments of the present application will be clearly and completely described below in conjunction with the accompanying drawings in the embodiments of the present application. Obviously, the described embodiments are merely a part of the embodiments of the present application, and not all of them. Based on the embodiments in the present application, all other embodiments obtained by a person of ordinary skill in the art without making creative labor fall within the scope of protection of the present application.

Figure 1:
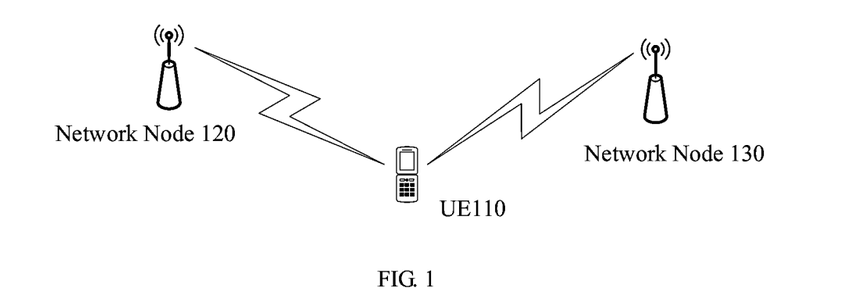
FIG. 1 is a schematic diagram of the system architecture provided according to an embodiment of the present application.

A schematic diagram of a network architecture provided by an embodiment of the present application is shown in FIG. 1, the network architecture includes: a UE and network nodes, wherein the UE is, for example, UE110 in FIG. 1, the network nodes are, for example, network node 120 and network node 130 in FIG. 1. The network nodes are deployed in an access network, e.g., network node 120 and network node 130 are deployed in an access network NG-RAN (Next Generation Radio Access Network) in a 5G system. The UE and the network nodes communicate with each other by some air interface technology, e.g., they may communicate with each other by cellular technology.

The UE involved in embodiments of the present application may be devices that provide voice and/or data connectivity to users, handheld devices with wireless connectivity, or other processing devices connected to a wireless modem, and so on. The types of UEs include cell phones, vehicle user terminals, tablets, laptops, personal digital assistants, mobile internet devices, wearable devices, and so on.

The network nodes involved in embodiments of the present application may be a base station, which may include a plurality of cells that provide services to the UE.

Depending on the specific application, the base station may also be referred to as an access point, or may be a device in the access network that communicates with the UE over one or more sectors on an air interface, or other names. The network nodes may be used to interchange the received air frames with Internet Protocol (IP) packets, acting as a router between the UE and the rest of the access network, where the rest of the access network may include an Internet Protocol (IP) communication network. The network nodes may also coordinate the management of attributes of the air interface. For example, the network nodes involved in embodiments of the present application may be a network device (BTS) in Global System for Mobile Communications (GSM) or Code Division Multiple Access (CDMA), a network device (NodeB) in Wideband Code Division Multiple Access (WCDMA), or an evolved network device (evolved Node B, eNB or e-NodeB) in Long Term Evolution (LTE) system, a 5G base station (gNB) in a 5G network architecture (next generation system), or a Home evolved Node B (HeNB), a relay node, a home base station (femto), a pico base station (pico), and so on, which are not limited in embodiments of the present application. In some network structures, the network nodes may include centralized unit (CU) nodes and distributed unit (DU) nodes, and the centralized units and distributed units may also be geographically separately arranged.

In order to make the purpose, technical solution, and advantages of the present application clearer, an implementation of the present application will be described in further detail below in conjunction with the accompanying drawings.

Figure 2:
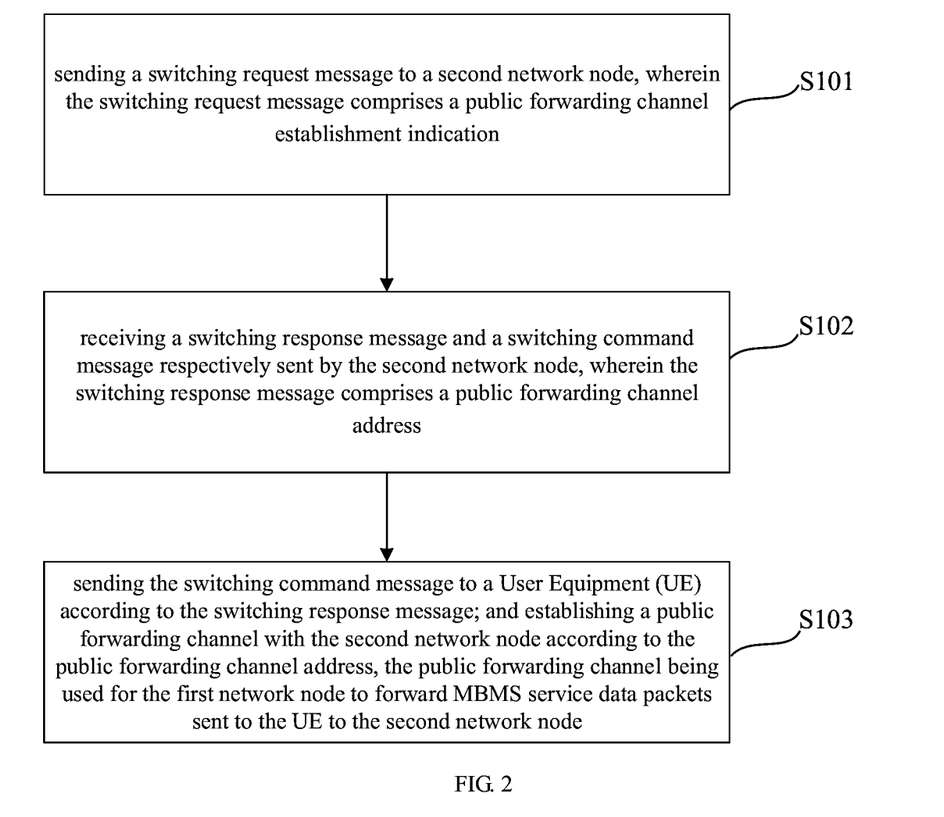
FIG. 2 is a schematic diagram of a flow of a switching method based on MBMS service provided according to an embodiment of the present application.

In an embodiment of the present application, there is provided a switching method based on MBMS service, applied to a first network node, which is shown in a schematic diagram of flow as shown in FIG. 2, the method comprising:

Step S101: Sending a switching request message to a second network node, the switching request message includes a public forwarding channel establishment indication.

Optionally, sending the switching request message to the second network node comprises:

sending the switching request message to a control plane entity of the second network node via Xn or Ng interface.

Step S102: Receiving a switching response message and a switching command message respectively sent by the second network node, the switching response message includes a public forwarding channel address.

Step S103: Sending the switching command message to a User Equipment (UE) according to the switching response message, and establishing a public forwarding channel with the second network node according to the public forwarding channel address, the public forwarding channel being used for the first network node to forward MBMS service data packets sent to the UE to the second network node.

Optionally, the second network node has no context information of the MBMS service data packets.

Optionally, the switching command message instructs the UE to switch from the first network node to the second network node, and the switching command message triggers the establishment of the public forwarding channel between the first network node and the second network node.

Optionally, establishing the public forwarding channel with the second network node according to the public forwarding channel address, comprises:

establishing the public forwarding channel with the second network node according to the public forwarding channel address and a granularity of MBMS sessions corresponding to the MBMS service data packets.

Optionally, forwarding of subsequent data packets of the MBMS service to the second network node is terminated when an end indication sent by the second network node is received.

Optionally, after establishing the public forwarding channel with the second network node according to the public forwarding channel address, the forwarding of the MBMS service data packets to the second network node is terminated when the end indication sent by the second network node is received.

Optionally, the UE is a first UE in a connected state that is receiving the MBMS service data packets.

Optionally, the public forwarding channel is reused when other UEs other than the UE switch from the first network node to the second network node, the other UEs include at least one of the following: the UE in the connected state that is receiving the MBMS sent by the first network node, a UE in an idle state, and a UE in an inactive state.

Optionally, after sending the switching command message to the UE, the method further comprises:

when context information of a first user plane is present in the MBMS service data packets, actively or periodically sending first numbering information of the MBMS service data packets to the second network node according to the granularity of the MBMS sessions corresponding to the MBMS service data packets, so that the second network node reconstructs corresponding context information of the user plane according to the first numbering information.

Optionally, the context information of the corresponding user plane includes context information of Packet Data Convergence Protocol (PDCP) of the second network node or context information of other user planes of the second network node.

Optionally, the context information of the first user plane includes context information of Packet Data Convergence Protocol (PDCP), and/or context information of other user planes; the first numbering information includes at least one of the following: an initial superframe number, a PDCP sequence number, and other numbering information.

Optionally, after sending the switching command message to the UE, the method further comprises:

sending, to the second network node, second numbering information of unsuccessfully forwarded data packets corresponding to the MBMS service data packets according to a granularity of a bearer corresponding to the MBMS service data packets, so that the second network node reconstructs the context information of the corresponding user plane according to the second numbering information and an unsuccessfully forwarded data packet is retransmitted selectively; the second numbering information includes at least one of the following: the initial superframe number, the PDCP sequence number, and the other numbering information.

Optionally, system broadcast information is updated according to MBMS service data packets supported by adjacent nodes other than the second network node when the switching command message and/or the switching response message include a list of failed MBMS sessions, the list of failed MBMS sessions being used for characterizing that the MBMS sessions in the list of failed MBMS sessions cannot be provided by a broadcast mode of the second network node; or the list of failed MBMS sessions being used for characterizing that the second network node may not support the MBMS sessions in the list of failed MBMS sessions.

In an embodiment of the present application, When the UE switches from the first network node to the second network node, the first network node establishes the public forwarding channel with the second network node, enabling the first network node to forward the MBMS service data packets sent to the UE to the second network node, enabling the UE to receive the MBMS service data packets from the second network node, thereby ensuring the continuity of transmission of the MBMS service data packets, and reducing the interruption delay of transmission of the MBMS service data packets.

Figure 3:
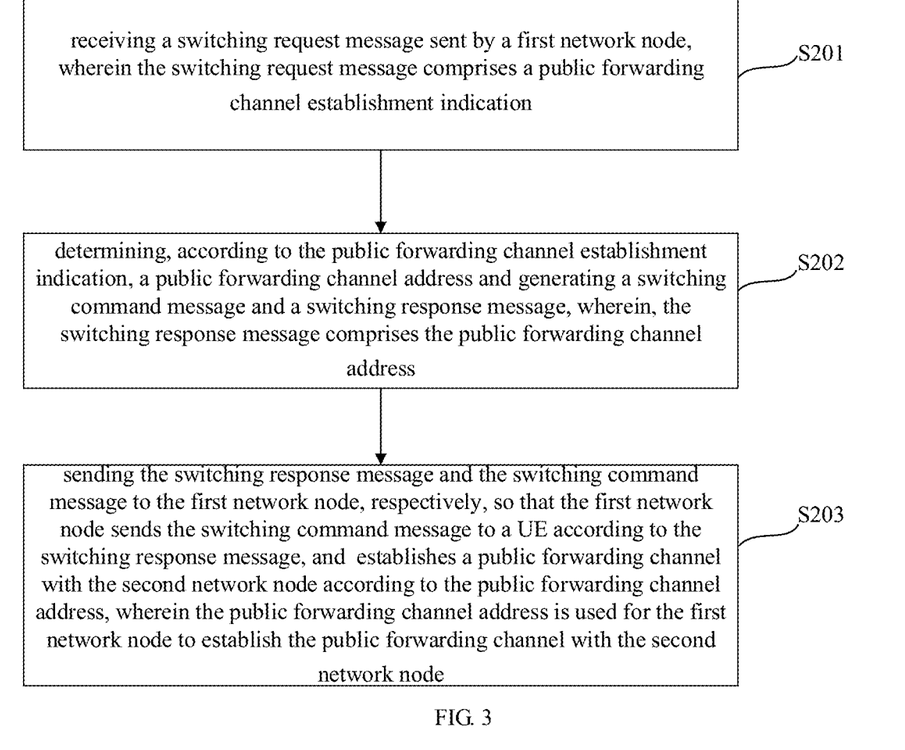
FIG. 3 is a schematic diagram of a flow of another Switching method based on MBMS service provided according to an embodiment of the present application.

In an embodiment of the present application, there is provided another switching method based on MBMS service, applied to a second network node, and a schematic diagram of flow of the method is as shown in FIG. 3, the method comprising:

Step S201: Receiving a switching request message sent by a first network node, the switching request message includes a public forwarding channel establishment indication. indication Step S202: Determining a public forwarding channel address and generating a switching command message and a switching response message according to the public forwarding channel establishment indication, the switching response message includes the public forwarding channel address.

Step S203: Sending a switching response message and the switching command message to the first network node, respectively, so that the first network node sends the switching command message to the UE according to the switching response message, and establishes a public forwarding channel with the second network node according to the public forwarding channel address, the public forwarding channel address for the first network node to establish a public forwarding channel with the second network node.

Optionally, sending the switching response message and the switching command message to the first network node, respectively, comprises:

sending the switching response message and the switching command message, respectively, to the first network node by a control plane entity of the second network node.

Optionally, determining the public forwarding channel address according to the public forwarding channel establishment indication, comprises:

sending a bearer establishment request message to a user plane entity of the second network node by the control plane entity of the second network node;

determining, by the user plane entity of the second network node, the public forwarding channel address according to the bearer establishment request message and the public forwarding channel establishment indication, and sending a bearer establishment response message including the public forwarding channel address to the control plane entity of the second network node.

Optionally, after sending the bearer establishment response message including the public forwarding channel address to the control plane entity of the second network node, the method further comprises:

establishing, by the control plane entity of the second network node, a bearer the same as the user plane entity of the second network node, the bearer includes an MBMS bearer.

Optionally, admission control is performed on the MBMS sessions according to an identification of the MBMS sessions included in the switching request message.

In an embodiment of the present application, When the UE switches from the first network node to the second network node, the first network node establishes the public forwarding channel with the second network node, enabling the first network node to forward the MBMS service data packets sent to the UE to the second network node, enabling the UE to receive the MBMS service data packets from the second network node, thereby ensuring the continuity of transmission of the MBMS service data packets, and reducing the interruption delay of transmission of the MBMS service data packets.

The switching method based on MBMS service of the above embodiments of the present application is comprehensively detailed by the following embodiments.

For a target network node that currently has no context information of a certain MBMS service data packet, by establishing a common forwarding channel, it is possible that the MBMS service data packet being transmitted by a source target network node can be transferred to the target network node without loss. The public forwarding channel is established at the granularity of the MBMS sessions. When, on the public forwarding channel, the target network node receives an end indication sent by the source target network node, it is indicated that data forwarding of the MBMS sessions is terminated.

Optionally, the first network node is the source target network node, and the second network node is the target network node.

Optionally, the first network node and the second network node are one distributed unit (DU) in the same base station respectively, wherein one DU corresponds to one cell. The first network node and the second network node correspond to different cells respectively, wherein the first network node corresponds to a source cell and the second network node corresponds to a target cell.

Optionally, the first network node and the second network node are different base stations.

Optionally, the UE is the first UE in a connected state that is receiving the MBMS service data packets, the switching command message instructs the UE to switch from the first network node to the second network node, and the switching command message triggers the establishment of the public forwarding channel between the first network node and the second network node.

Optional Embodiment 1

The steps for the establishment of the public forwarding channel are shown as follows:

Step 1: A first network node sends a switching request message to a second network node, and the switching request message includes a public forwarding channel establishment indication, an identification of MBMS sessions, Quality of Service (QoS) information, and so on.

Optionally, the first network node sends the switching request message to the second network node via Xn or Ng interface.

Step 2: The second network node receives the switching request message sent by the first network node; Optionally, the second network node performs admission control on the MBMS sessions according to the identification of the MBMS sessions included in the switching request message; the second network node determines a public forwarding channel address and generates a switching command message according to the public forwarding channel establishment indication included in the switching request message; the second network node sends a switching response message and the switching command message to the first network node, respectively, so that the first network node sends the switching command message to the UE, wherein the switching response message includes the public forwarding channel address, and the public forwarding channel address is used for the first network node to establish the public forwarding channel with the second network node.

Step 3: The first network node receives a switching response message and a switching command message respectively sent by the second network node, wherein the switching response message includes the public forwarding channel address; the first network node sends the switching command message to a User Equipment (UE).

Optionally, the first network node establishes a public forwarding channel with the second network node according to the public forwarding channel address, and the public forwarding channel is used for the first network node to forward MBMS service data packets sent to the UE to the second network node, and the second network node has no context information of the MBMS service data packets.

Step 4: Optionally, when context information of a first user plane is present in the MBMS service data packet, the first network node actively or periodically sends first numbering information of the MBMS service data packets to the second network node according to the granularity of the MBMS sessions corresponding to the MBMS service data packets, so that the second network node reconstructs corresponding context information of the user plane according to the first numbering information.

Optionally, the context information of the first user plane includes context information of Packet Data Convergence Protocol (PDCP), and/or context information of other user planes; the first numbering information includes at least one of the following: an initial superframe number, a PDCP sequence number, and other numbering information.

Optionally, the context information of the PDCP is, for example, a serial number, a key, a header compression and so on.

Optionally, the context information of the first user plane is transmitted by using a dedicated signaling connection between the first network node and the second network node for the UE.

Optionally, the contextual information of the first user plane is transmitted by using a user plane channel of the granularity of the MBMS sessions.

Step 4a: In order to prevent the overflow of data packet reception window of the PDCP or other similar user planes, the first network node may actively or periodically send the first numbering information to the second network node, and perform updating of the first numbering information according to the granularity of the MBMS sessions.

The technical solution provided by embodiments of the present application has at least the following beneficial effects:

When the UE switches from the first network node to the second network node, the first network node establishes the public forwarding channel with the second network node, enabling the first network node to forward the MBMS service data packets sent to the UE to the second network node, enabling the UE to receive the MBMS service data packets from the second network node, thereby ensuring the continuity of transmission of the MBMS service data packets, and reducing the interruption delay of transmission of the MBMS service data packets.

Optional Embodiment 2

The steps of dedicated bearer switching are shown as follows.

Step 0: Before a UE switches from a first network node to a second network node, the UE uses a dedicated bearer; after the UE switches from the first network node to the second network node, the UE continues to use the dedicated bearer or a multicast bearer.

Steps 1 to 4: Steps 1 to 4 of embodiment 2 are the same as steps 1 to 4 of embodiment 1.

Step 5: Optionally, the first network node sends, to the second network node, second numbering information of unsuccessfully forwarded data packets corresponding to the MBMS service data packets according to a granularity of a bearer corresponding to the MBMS service data packets, so that the second network node reconstructs the context information of the corresponding user plane according to the second numbering information and an unsuccessfully forwarded data packet is retransmitted selectively; the second numbering information includes at least one of the following: the initial superframe number, the PDCP sequence number, and the other numbering information.

Optional Embodiment 3

The steps of a failure process are shown as follows.

Step 1: A first network node sends a switching request message to a second network node, and the switching request message includes a public forwarding channel establishment indication, an identification of MBMS sessions, Quality of Service (QoS) information, and so on.

Optionally, the first network node sends the switching request message to the second network node via Xn or Ng interface.

Step 2: The second network node receives the switching request message sent by the first network node; Optionally, the second network node performs admission control on the MBMS sessions according to the identification of the MBMS sessions included in the switching request message; When the second network node decides to reject the establishment of some or all MBMS sessions, a failure indication is returned, specifically, a list of failed MBMS sessions is carried in the switching command message, such as an RRC reconfiguration message, generated by the second network node.

Optionally, the switching response message will also carry the list of failed MBMS sessions and contain a reason for the failure.

Optionally, the switching command message is used to inform the UE: which MBMS sessions will be unable to be provided by a broadcast mode of the second network node; the switching response message is used to inform the first network node that the second network node may be unable to support the corresponding MBMS sessions.

Optionally, system broadcast information is updated by the first network node according to MBMS service data packets supported by adjacent nodes other than the second network node when the switching command message includes a list of failed MBMS sessions, the list of failed MBMS sessions included in the switching command message being used for characterizing that the MBMS sessions in the list of failed MBMS sessions cannot be provided by a broadcast mode of the second network node.

Optionally, system broadcast information is updated by the first network node according to MBMS service data packets supported by adjacent nodes other than the second network node when the switching response message includes a list of failed MBMS sessions, the list of failed MBMS sessions included in the switching response message being used for characterizing that the second network node may not support the MBMS sessions in the list of failed MBMS sessions.

Step 3: After the UE receives the switching command message, it will decide whether to initiate a new unicast bearer establishment process for the corresponding MBMS service data packets at the second network node according to information about whether the MBMS sessions can continue to be received at the second network node.

Step 3a: optionally, after the first network node receives the switching response message that the MBMS sessions are rejected, it will update the corresponding system broadcast information for MBMS service data packets supported by neighboring cells.

Optional Embodiment 4

In a separation scenario of control plane (CP) entity and user plane (UP) entity of the CU of the gNB, the steps of the public forwarding channel establishment are shown as follows.

Step 1: A first network node sends a switching request message to a second network node, and the switching request message includes a public forwarding channel establishment indication, an identification of MBMS sessions, Quality of Service (QoS) information, and so on.

Optionally, the first network node sends the switching request message to the second network node via Xn or Ng interface.

Optionally, the first network node and the second network node are different gNB.

Step 2: A control plane gNB-CP entity of the second network node sends a bearer establishment request message to a user plane gNB-UP entity of the second network node; a public forwarding channel address is determined, by the user plane gNB-UP entity of the second network node, according to the bearer establishment request message and the public forwarding channel establishment indication, and a bearer establishment response message including the public forwarding channel address is sent to the control plane gNB-CP entity of the second network node.

Step 3: The control plane gNB-CP entity of the second network node establishes a corresponding bearer with the user plane gNB-DU entity of the second network node, the bearer includes an MBMS bearer, and so on Step 4: The control plane gNB-CP entity of the second network node sends a switching response message and a switching command message to the first network node, respectively, wherein the switching response message includes a public forwarding channel address, and the public forwarding channel address is used for the first network node to establish the public forwarding channel with the second network node.

Steps 5 to 6: Steps 5 to 6 of embodiment 4 are the same as steps 3 to 4 of embodiment 1.

The technical solution provided by embodiments of the present application has at least the following beneficial effects:

When the UE switches from the first network node to the second network node, the first network node establishes the public forwarding channel with the second network node, enabling the first network node to forward the MBMS service data packets sent to the UE to the second network node, enabling the UE to receive the MBMS service data packets from the second network node, thereby ensuring the continuity of transmission of the MBMS service data packets, and reducing the interruption delay of transmission of the MBMS service data packets.

Figure 4:
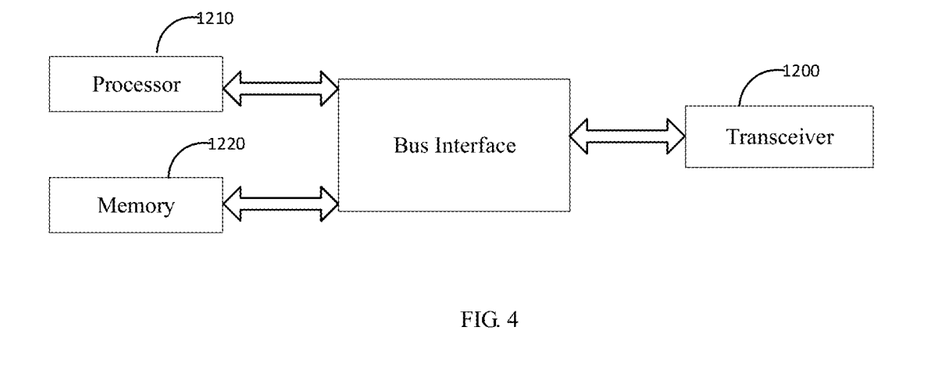
FIG. 4 is a schematic diagram of the structure of a switching apparatus based on MBMS service provided according to an embodiment of the present application.

Based on the same inventive concept, an embodiment of the present application also provides a switching apparatus based on MBMS service, applied to a first network node, which apparatus has a schematic structure as shown in FIG. 4, wherein a transceiver 1200 is used for receiving and sending data under the control of a processor 1210.

In FIG. 4, the bus architecture may include any number of interconnected buses and bridges, specifically various circuits of one or more processors represented by the processor 1210 and a memory represented by the memory 1220 are linked together. The bus architecture may also link together various other circuits such as peripherals, voltage regulators, and power management circuits, which are well known in the art and, therefore, will not be further described herein. The bus interface provides an interface. The transceiver 1200 may be a plurality of elements, i.e., including a transmitter and a receiver, providing units for communicating with various other apparatus over transmission media, which include transmission media such as wireless channels, wired channels, fiber optic cables, and so on. The processor 1210 is responsible for managing the bus architecture and usual processing, and the memory 1220 may store the data used in performing operations by the processor 1210.

The processor 1210 may be a Central Processing Unit (CPU), an Application Specific Integrated Circuit (ASIC), a Field Programmable Gate Array (FPGA), or a Complex Programmable Logic Device (CPLD), and the processor may also have a multi-core architecture.

The processor 1210 is used to read a computer program in the memory and perform the following operations:

sending a switching request message to a second network node, the switching request message includes a public forwarding channel establishment indication;

receiving a switching response message and a switching command message respectively sent by a second network node, the switching response message includes the public forwarding channel address;

sending the switching command message to a user equipment (UE) according to the switching response message; and establishing a public forwarding channel with the second network node according to the public forwarding channel address, the public forwarding channel being used for the first network node to forward MBMS service data packets sent to the UE to the second network node.

Optionally, the establishing the public forwarding channel with the second network node according to the public forwarding channel address, comprises:

establishing the public forwarding channel with the second network node according to the public forwarding channel address and a granularity of MBMS sessions corresponding to the MBMS service data packets.

Optionally, the forwarding of subsequent data packets of the MBMS service to the second network node is terminated when an end indication sent by the second network node is received.

Optionally, the UE is a first UE in a connected state that is receiving the MBMS service data packets.

Optionally, the public forwarding channel is reused when other UEs other than the UE switch from the first network node to the second network node, the other UEs include at least one of the following: the UE in the connected state that is receiving the MBMS sent by the first network node, a UE in an idle state, and a UE in an inactive state.

Optionally, after sending the switching command message to the UE, the method further comprises:

when context information of a first user plane is present in the MBMS service data packets, actively or periodically sending first numbering information of the MBMS service data packets to the second network node according to the granularity of the MBMS sessions corresponding to the MBMS service data packet, so that the second network node reconstructs the context information of the corresponding user plane according to the first numbering information.

Optionally, the context information of the first user plane includes context information of Packet Data Convergence Protocol (PDCP), and/or context information of other user planes; the first numbering information includes at least one of the following: an initial superframe number, a PDCP sequence number, and other numbering information.

Optionally, after sending the switching command message to the UE, the method further comprises:

sending, to the second network node, second numbering information of unsuccessfully forwarded data packets corresponding to the MBMS service data packets according to a granularity of a bearer corresponding to the MBMS service data packets, so that the second network node reconstructs the context information of the corresponding user plane according to the second numbering information and an unsuccessfully forwarded data packet is retransmitted selectively; the second numbering information includes at least one of the following: the initial superframe number, the PDCP sequence number, and the other numbering information.

Optionally, system broadcast information is updated according to MBMS service data packets supported by adjacent nodes other than the second network node when the switching command message and/or the switching response message include a list of failed MBMS sessions, the list of failed MBMS sessions being used for characterizing that the MBMS sessions in the list of failed MBMS sessions cannot be provided by a broadcast mode of the second network node; or the list of failed MBMS sessions being used for characterizing that the second network node may not support the MBMS sessions in the list of failed MBMS sessions.

Optionally, the sending the switching request message to the second network node comprises:

sending the switching request message to a control plane entity of the second network node via Xn or Ng interface.

It should be noted here that the above apparatus provided by embodiments of the present invention can achieve all method steps implemented in embodiments of the above method, and can achieve the same technical effects, and the same parts and beneficial effects in the present embodiment as the method embodiment will not be specifically detailed herein.

Figure 5:
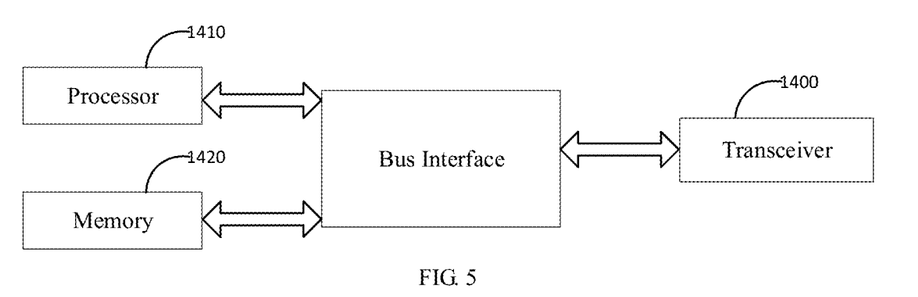
FIG. 5 is a schematic diagram of the structure of a switching apparatus based on MBMS service provided according to an embodiment of the present application.

Based on the same inventive concept, an embodiment of the present application also provides a switching apparatus based on MBMS service, applied to a second network node, which apparatus has a schematic structure as shown in FIG. 5, wherein a transceiver 1400 is used for receiving and sending data under the control of a processor 1410.

In FIG. 5, the bus architecture may include any number of interconnected buses and bridges, specifically various circuits of one or more processors represented by the processor 1410 and a memory represented by the memory 1420 are linked together. The bus architecture may also link together various other circuits such as peripherals, voltage regulators, and power management circuits, which are well known in the art and, therefore, will not be further described herein. The bus interface provides an interface. The transceiver 1400 may be a plurality of elements, i.e., including a transmitter and a receiver, providing units for communicating with various other apparatus over a transmission media, which include transmission media such as wireless channels, wired channels, fiber optic cables, and so on. The processor 1410 is responsible for managing the bus architecture and usual processing, and the memory 1420 may store the data used in performing operations by the processor 1410.

The processor 1410 may be a Central Processing Unit (CPU), an Application Specific Integrated Circuit (ASIC), a Field Programmable Gate Array (FPGA), or a Complex Programmable Logic Device (CPLD), and the processor may also have a multi-core architecture.

The processor 1410 is used to read a computer program in the memory and perform the following operations:

receiving a switching request message sent by a first network node, the switching request message includes a public forwarding channel establishment indication;

determining a public forwarding channel address and generating a switching command message and a switching response message according to the public forwarding channel establishment indication, the switching response message includes the public forwarding channel address;

sending a switching response message and the switching command message to the first network node, respectively, so that the first network node sends the switching command message to the UE according to the switching response message, and establishes a public forwarding channel with the second network node according to the public forwarding channel address, the public forwarding channel address being used for the first network node to establish the public forwarding channel with the second network node.

Optionally, sending the switching response message and the switching command message to the first network node, respectively, comprises:

sending the switching response message and the switching command message, respectively, to the first network node by a control plane entity of the second network node.

Optionally, determining the public forwarding channel address according to the public forwarding channel establishment indication, comprises:

sending a bearer establishment request message to a user plane entity of the second network node by the control plane entity of the second network node;

determining, by the user plane entity of the second network node, the public forwarding channel address according to the bearer establishment request message and the public forwarding channel establishment indication, and sending a bearer establishment response message including the public forwarding channel address to the control plane entity of the second network node.

Optionally, after sending the bearer establishment response message including the public forwarding channel address to the control plane entity of the second network node, the method further comprises:

establishing, by the control plane entity of the second network node, a bearer the same as the user plane entity of the second network node, the bearer includes an MBMS bearer.

Optionally, admission control is performed on the MBMS sessions according to an identification of the MBMS sessions included in the switching request message.

It should be noted here that the above apparatus provided by embodiments of the present invention can achieve all method steps implemented in embodiments of the above method, and can achieve the same technical effects, and the same parts and beneficial effects in the present embodiment as the method embodiment will not be specifically detailed herein.

Figure 6:
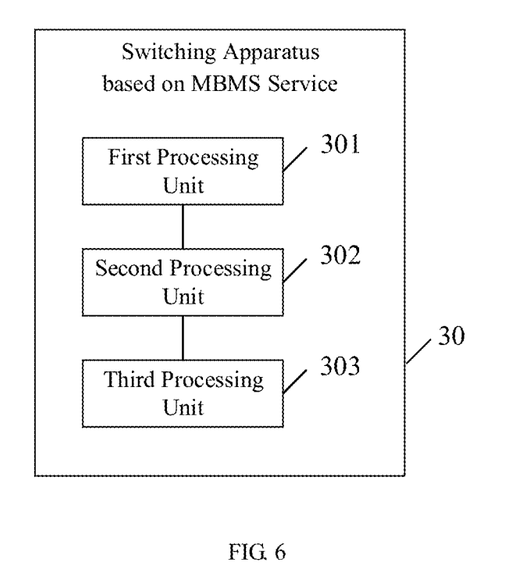
FIG. 6 is a schematic diagram of the structure of a switching apparatus based on MBMS service provided according to an embodiment of the present application.

Based on the same inventive concept of the preceding embodiments, an embodiment of the present application also provides a switching apparatus based on MBMS service, which has a schematic structure as shown in FIG. 6, and the switching apparatus based on MBMS service 30 includes a first processing unit 301, a second processing unit 302, and a third processing unit 303.

The first processing unit 301 is used for sending a switching request message to a second network node, the switching request message includes a public forwarding channel establishment indication;

The second processing unit 302 is used for receiving a switching response message and a switching command message respectively sent by the second network node, the switching response message includes a public forwarding channel address;

The third processing unit 303 is used for sending the switching command message to a User Equipment (UE) according to the switching response message; establishing a public forwarding channel with the second network node according to the public forwarding channel address, the public forwarding channel being used for the first network node to forward MBMS service data packets sent to the UE to the second network node.

Optionally, the third processing unit 303 is specifically used for establishing the public forwarding channel with the second network node according to the public forwarding channel address and a granularity of MBMS sessions corresponding to the MBMS service data packets.

Optionally, the forwarding of subsequent data packets of the MBMS service to the second network node is terminated when an end indication sent by the second network node is received.

Optionally, the UE is a first UE in a connected state that is receiving the MBMS service data packets.

Optionally, the public forwarding channel is reused when other UEs other than the UE switch from the first network node to the second network node, the other UEs include at least one of the following: the UE in the connected state that is receiving the MBMS sent by the first network node, a UE in an idle state, and a UE in an inactive state.

Optionally, after sending the switching command message to the UE, the method further comprises:

when context information of a first user plane is present in the MBMS service data packets, actively or periodically sending first numbering information of the MBMS service data packets to the second network node according to the granularity of the MBMS sessions corresponding to the MBMS service data packet, so that the second network node reconstructs the context information of the corresponding user plane according to the first numbering information.

Optionally, the context information of the first user plane includes context information of Packet Data Convergence Protocol (PDCP), and/or context information of other user planes; the first numbering information includes at least one of the following: an initial superframe number, a PDCP sequence number, and other numbering information.

Optionally, after sending the switching command message to the UE, further comprising:

sending, to the second network node, second numbering information of unsuccessfully forwarded data packets corresponding to the MBMS service data packets according to a granularity of a bearer corresponding to the MBMS service data packets, so that the second network node reconstructs the context information of the corresponding user plane according to the second numbering information and an unsuccessfully forwarded data packet is retransmitted selectively; the second numbering information includes at least one of the following: the initial superframe number, the PDCP sequence number, and the other numbering information.

Optionally, system broadcast information is updated according to MBMS service data packets supported by adjacent nodes other than the second network node when the switching command message and/or the switching response message include a list of failed MBMS sessions, the list of failed MBMS sessions being used for characterizing that the MBMS sessions in the list of failed MBMS sessions cannot be provided by a broadcast mode of the second network node; or the list of failed MBMS sessions being used for characterizing that the second network node may not support the MBMS sessions in the list of failed MBMS sessions.

Optionally, the first processing unit 301 is specifically used for sending the switching request message to a control plane entity of the second network node via Xn or Ng interface.

It should be noted here that the above apparatus provided by embodiments of the present invention can achieve all method steps implemented in embodiments of the above method, and can achieve the same technical effects, and the same parts and beneficial effects in the present embodiment as the method embodiment will not be specifically detailed herein.

Figure 7:
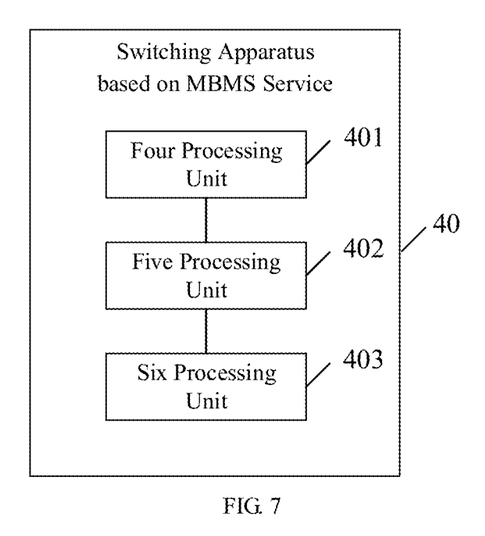
FIG. 7 is a schematic diagram of the structure of a switching apparatus based on MBMS service provided according to an embodiment of the present application.

Based on the same inventive concept of the preceding embodiments, an embodiment of the present application also provides a switching apparatus based on MBMS service, which has a schematic structure as shown in FIG. 7, and the switching apparatus based on MBMS service 40 includes a fourth processing unit 401, a fifth processing unit 402, and a sixth processing unit 403.

The fourth processing unit 401 is used for receiving a switching request message sent by a first network node, the switching request message includes a public forwarding channel establishment indication;

The fifth processing unit 402 is used for determining a public forwarding channel address and generating a switching command message and a switching response message according to the public forwarding channel establishment indication, the switching response message includes the public forwarding channel address;

The sixth processing unit 403 is used for sending the switching response message and the switching command message to the first network node, respectively, so that the first network node sends the switching command message to a User Equipment (UE) according to the switching response message, and establishes a public forwarding channel with the second network node according to the public forwarding channel address, the public forwarding channel address being used for the first network node to establish the public forwarding channel with the second network node.

Optionally, the sixth processing unit 403 is specifically used for sending the switching response message and the switching command message, respectively, to the first network node by a control plane entity of the second network node.

Optionally, the fifth processing unit 402 is specifically used for sending a bearer establishment request message to a user plane entity of the second network node by the control plane entity of the second network node; determining, by the user plane entity of the second network node, the public forwarding channel address according to the bearer establishment request message and the public forwarding channel establishment indication, and sending a bearer establishment response message including the public forwarding channel address to the control plane entity of the second network node.

Optionally, after sending the bearer establishment response message including the public forwarding channel address to the control plane entity of the second network node, the method further comprises:

establishing, by the control plane entity of the second network node, a bearer the same as the user plane entity of the second network node, the bearer includes an MBMS bearer.

Optionally, admission control is performed on the MBMS sessions according to an identification of the MBMS sessions included in the switching request message.

It should be noted here that the above apparatus provided by embodiments of the present invention can achieve all method steps implemented in embodiments of the above method, and can achieve the same technical effects, and the same parts and beneficial effects in the present embodiment as the method embodiment will not be specifically detailed herein.

It should be noted that the dividing of the units in embodiments of the present application is schematic and is only a logical functional division, and there may be other dividing ways in actual implementations. In addition, respective functional units in various embodiments of the present application may be integrated in one processing unit, or each unit may be physically present separately, or two or more units may be integrated in one unit. The above integrated units may be implemented in the form of hardware, and also may be implemented in the form of software functional units.

Said integrated units may be stored in one computer-readable storage medium when implemented in the form of software functional units and sold or used as a separate product. Based on such understanding, the technical solution of the present application, or part that contributes to the prior art, or all or part of the technical solution, essentially may be embodied in the form of a software product stored in a storage medium and including serval instructions to cause a computer device (which may be a personal computer, server, or network device, and so on) or processor to perform all or some of the steps of the method described in various embodiments of the present application. The aforementioned storage media include various media that may store program code, such as USB flash drive, mobile hard disk, read-only memory (ROM), random access memory (RAM), disk or CD-ROM.

Based on the same inventive concept, an embodiment of the present application also provides a computer-readable storage medium storing a computer program that is used to embody any of the steps of any one of the switching methods based on MBMS service provided in any of the embodiments of the present application or any optional implementation when executed by a processor.

The computer-readable storage medium may be any available medium or data storage device accessible by the processor, including but not limited to magnetic memory (e.g., floppy disk, hard disk, magnetic tape, magnetic optical disk (MO), and so on), optical memory (e.g., CD, DVD, BD, HVD, and so on), and semiconductor memory (e.g., ROM, EPROM, EEPROM, non-volatile memory (NAND FLASH), solid state drive (SSD)), and so on.

Those skilled in the art should understand that embodiments of the present application may be provided as methods, systems, or computer program products. Accordingly, the present application may take the form of a full hardware embodiment, a full software embodiment, or an embodiment combining software and hardware aspects. Moreover, the present application may take the form of a computer program product implemented on one or more computer usable storage media (including, but not limited to, disk memory and optical memory, and so on) containing computer usable program code therein.

The present application is described with reference to flowcharts and/or block diagrams of methods, devices (systems), and computer program products according to embodiments of the present application. It is to be understood that each process and/or block in the flowchart and/or block diagram, and the combination of processes and/or blocks in the flowchart and/or block diagram, may be implemented by computer-executable instructions. These computer-executable instructions may be provided to a processor of a general-purpose computer, a specialized computer, an embedded machine, or other programmable data processing device to produce a machine, such that instructions executed by the processor of the computer or other programmable data processing device produce a means for implementing a function specified in one or more processes of the flowchart and/or one or more blocks of the block diagram.

These processor-executable instructions may also be stored in a computer-readable memory capable of directing the computer or other programmable data processing device to operate in a particular manner such that the instructions stored in the computer-readable memory produce an article of manufacture including an instruction means that implements the function specified in one or more processes of the flowcharts and/or one or more blocks of the block diagrams.

These processor-executable instructions may also be loaded onto a computer or other programmable data processing device such that a series of operational steps are performed on the computer or other programmable device to produce computer-implemented processing, so that the instructions executed on the computer or other programmable device provide steps for implementing the function specified in one or more processes of the flowcharts and/or one or more blocks of the block diagrams.

Obviously, those skilled in the art can make various modifications and variations of this application without departing from the spirit and scope of this application. Thus, if these modifications and variations of this application fall within the scope of the claims of this application and its equivalent technology, then this application is also intended to include them.

What is claimed is:

1. A switching method based on Multimedia Broadcast Multicast Service (MBMS) service, applied to a first network node, comprising:

sending a switching request message to a second network node, wherein the switching request message comprises a public forwarding channel establishment indication;

receiving a switching response message and a switching command message respectively sent by the second network node, wherein the switching response message comprises a public forwarding channel address;

sending the switching command message to a User Equipment (UE) according to the switching response message;

establishing a public forwarding channel with the second network node according to the public forwarding channel address, the public forwarding channel being used by the first network node to forward MBMS service data packets sent to the UE to the second network node; and updating, when the switching command message and/or the switching response message includes a list of failed MBMS sessions, system broadcast information according to MBMS service data packets supported by adjacent nodes other than the second network node, the list of failed MBMS sessions being used for characterizing that the MBMS sessions in the list of failed MBMS sessions cannot be provided by a broadcast mode of the second network node; or the list of failed MBMS sessions being used for characterizing that the second network node does not support the MBMS sessions in the list of failed MBMS sessions.

2. The method of claim 1, wherein, establishing a public forwarding channel with the second network node according to the public forwarding channel address, comprises:

establishing the public forwarding channel with the second network node according to the public forwarding channel address and a granularity of MBMS sessions corresponding to the MBMS service data packets.

3. The method of claim 1, further comprising:

terminating, when an end indication sent by the second network node is received, the forwarding of subsequent data packets of the MBMS service to the second network node.

4. The method of claim 1, wherein, after sending the switching command message to the UE, further comprising:

when context information of a first user plane is present in the MBMS service data packets, actively or periodically sending first numbering information of the MBMS service data packets to the second network node according to the granularity of the MBMS sessions corresponding to the MBMS service data packets, so that the second network node reconstructs corresponding context information of the user plane according to the first numbering information.

5. The method of claim 4, wherein, the context information of the first user plane includes context information of Packet Data Convergence Protocol (PDCP), and/or context information of other user planes; the first numbering information includes at least one of the following: an initial superframe number, a PDCP sequence number, and other numbering information.

6. The method of claim 1, wherein, after sending the switching command message to the UE, further comprising:

sending, to the second network node, second numbering information of unsuccessfully forwarded data packets corresponding to the MBMS service data packets according to a granularity of a bearer corresponding to the MBMS service data packets, so that the second network node reconstructs the context information of the corresponding user plane according to the second numbering information and an unsuccessfully forwarded data packet is retransmitted selectively; the second numbering information includes at least one of the following: an initial superframe number, a PDCP sequence number, and other numbering information.

7. The method of claim 1, wherein, the sending the switching request message to the second network node comprises:

sending the switching request message to a control plane entity of the second network node via Xn or Ng interface.

8. The method of claim 1, wherein the UE is first UE to be switched in a connected state that is receiving the MBMS service data packets.

9. The method of claim 8, further comprising:

reusing the public forwarding channel when another UE other than the UE switches from the first network node to the second network node, the another UE comprises at least one of the following: a UE in a connected state that is receiving the MBMS sent by the first network node, a UE in an idle state, and a UE in an inactive state.

10. A non-transitory computer-readable storage medium having stored therein a computer program, which causes a processor to perform the method of claim 1.

11. A switching method based on MBMS service, applied to a second network node, comprising:

receiving a switching request message sent by a first network node, wherein the switching request message comprises a public forwarding channel establishment indication;

determining, according to the public forwarding channel establishment indication, a public forwarding channel address and generating a switching command message and a switching response message, wherein, the switching response message comprises the public forwarding channel address;

sending the switching response message and the switching command message to the first network node, respectively, so that the first network node sends the switching command message to a UE according to the switching response message, and establishes a public forwarding channel with the second network node according to the public forwarding channel address, wherein the public forwarding channel address is used by the first network node to establish the public forwarding channel with the second network node, wherein, when the switching command message and/or the switching response message includes a list of failed MBMS sessions, system broadcast information is updated by the first network node according to MBMS service data packets supported by adjacent nodes other than the second network node, the list of failed MBMS sessions being used for characterizing that the MBMS sessions in the list of failed MBMS sessions cannot be provided by a broadcast mode of the second network node; or the list of failed MBMS sessions being used for characterizing that the second network node does not support the MBMS sessions in the list of failed MBMS sessions.

12. The method of claim 11, wherein, sending the switching response message and the switching command message to the first network node, respectively, comprises:

Sending, by a control plane entity of the second network node, the switching response message, and the switching command message to the first network node respectively.

13. The method of claim 11, wherein, determining the public forwarding channel address according to the public forwarding channel establishment indication, comprises:

Sending, by a control plane entity of the second network node, a bearer establishment request message to a user plane entity of the second network node;

determining, by the user plane entity of the second network node, a public forwarding channel address according to the bearer establishment request message and the public forwarding channel establishment indication, and sending a bearer establishment response message including the public forwarding channel address to the control plane entity of the second network node.

14. The method of claim 13, wherein, after sending the bearer establishment response message including the public forwarding channel address to the control plane entity of the second network node, further comprising:
establishing, by the control plane entity of the second network node, a bearer that is the same as the user plane entity of the second network node, the bearer comprises an MBMS bearer.

15. The method of claim 11, further comprising:
performing admission control on the MBMS sessions according to an identification of the MBMS sessions included in the switching request message.

16. A switching apparatus based on MBMS service, applied to a second network node, comprising:
a memory, configured to store a computer program;
a transceiver, configured to send and receive data under the control of a processor; and
a processor, configured to read the computer program in the memory and perform method of claim 11.

17. A non-transitory computer-readable storage medium having stored therein a computer program, which causes a processor to perform the method of claim 11.

18. A switching apparatus based on MBMS service, applied to a first network node, comprising:
a memory, configured to store a computer program;
a transceiver, configured to send and receive data under the control of a processor; and
a processor, configured to read the computer program in the memory and perform the following actions:

sending a switching request message to a second network node, wherein the switching request message comprises a public forwarding channel establishment indication;

receiving a switching response message and a switching command message respectively sent by the second network node, wherein the switching response message comprises a public forwarding channel address;

sending the switching command message to a User Equipment (UE) according to the switching response message;

establishing a public forwarding channel with the second network node according to the public forwarding channel address, the public forwarding channel being used by the first network node to forward MBMS service data packets sent to the UE to the second network node; and updating, when the switching command message and/or the switching response message includes a list of failed MBMS sessions, system broadcast information according to MBMS service data packets supported by adjacent nodes other than the second network node, the list of failed MBMS sessions being used for characterizing that the MBMS sessions in the list of failed MBMS sessions cannot be provided by a broadcast mode of the second network node; or the list of failed MBMS sessions being used for characterizing that the second network node does not support the MBMS sessions in the list of failed MBMS sessions.

* * * * *